US008451518B2

(12) United States Patent  
Calamita

(10) Patent No.: US 8,451,518 B2  
(45) Date of Patent: May 28, 2013

(54) SYSTEM AND METHOD FOR DETECTING COLOR-TO-COLOR MISREGISTRATION

(75) Inventor: James P. Calamita, Spencerport, NY (US)

(73) Assignee: Xerox Corporation, Norwalk, CT (US)

( * ) Notice: Subject to any disclaimer, the term of this patent is extended or adjusted under 35 U.S.C. 154(b) by 210 days.

(21) Appl. No.: 12/763,442

(22) Filed: Apr. 20, 2010

(65) Prior Publication Data

US 2011/0255138 A1     Oct. 20, 2011

(51) Int. Cl.  
*H04N 1/46* (2006.01)

(52) U.S. Cl.  
USPC .......... 358/504; 358/1.9; 358/3.26; 358/3.27; 358/518; 399/301

(58) Field of Classification Search  
CPC combination set(s) only.  
See application file for complete search history.

(56) References Cited

U.S. PATENT DOCUMENTS

| 7,526,241 | B2 * | 4/2009 | Kinoshita | 399/301 |
| 2007/0048031 | A1 * | 3/2007 | Kinoshita | 399/301 |
| 2007/0189789 | A1 * | 8/2007 | Suzuki | 399/49 |
| 2008/0030787 | A1 | 2/2008 | McElvain | |
| 2008/0030788 | A1 | 2/2008 | McElvain et al. | |
| 2008/0030789 | A1 | 2/2008 | McElvain et al. | |
| 2008/0056777 | A1 * | 3/2008 | Osawa | 399/301 |
| 2008/0170280 | A1 | 7/2008 | Wang et al. | |
| 2008/0292368 | A1 | 11/2008 | Baretsky et al. | |
| 2008/0294363 | A1 | 11/2008 | Parmar et al. | |
| 2010/0178069 | A1 * | 7/2010 | You et al. | 399/39 |
| 2010/0178083 | A1 * | 7/2010 | Lee | 399/301 |

FOREIGN PATENT DOCUMENTS

JP     2005-134920     *     5/2005

* cited by examiner

*Primary Examiner* — Dung Tran  
(74) *Attorney, Agent, or Firm* — Simpson & Simpson, PLLC

(57) ABSTRACT

A system and method is provided for detecting and correcting color-to-color process direction misregistration errors, including a printer capable of printing in a plurality of colors, the printer having a sensor for generating a signal including information corresponding to a color registration pattern printed on a substrate by the printer. The system and method further include a processor for receiving the signal from the sensor and analyzing the signal for detecting color-to-color process direction misregistration via an algorithm. The color registration pattern includes a plurality of segments, each segment associated with a different color of the plurality of colors and each segment including at least one different dimension from at least one other segment of the plurality of segments.

20 Claims, 6 Drawing Sheets

SYSTEM AND METHOD FOR DETECTING COLOR-TO-COLOR MISREGISTRATION

CROSS-REFERENCE TO RELATED U.S. APPLICATIONS

This application is related to commonly-owned U.S. Application No. 2008/0030787, filed on Aug. 1, 2006; the entire contents of this patent application incorporated herein by reference. This application is also related to commonly-owned U.S. Application No. 2008/0030788, filed on Aug. 1, 2006; the entire contents of this patent application incorporated herein by reference. This application is also related to commonly-owned U.S. Application No. 2008/0030789, filed on Aug. 1, 2006; the entire contents of this patent application incorporated herein by reference. This application is also related to commonly-owned U.S. Application No. 2008/0170280, filed on Jan. 16, 2007; the entire contents of this patent application incorporated herein by reference. This application is also related to commonly-owned U.S. Application No. 2008/0292368, filed on May 21, 2007; the entire contents of this patent application incorporated herein by reference. This application is also related to commonly-owned U.S. Application No. 2008/0294363, filed on May 21, 2007; the entire contents of this patent application incorporated herein by reference.

BACKGROUND

In multi-color printing systems, a limited number of color separations are used for marking a substrate for achieving a wider variety of colors, with each separation marking the substrate using discrete shapes, such as dots having a circular or oval shape, or periodic line patterns. This concept is generally known as color halftoning, and involves combining two or more patterned separations on the substrate. The selection of color separations and halftone design are carefully chosen for achieving a visual effect of the desired color.

Many prior art printing systems use cyan, magenta, yellow and black (also referred to as CMYK) color separations that mark a substrate using discrete cluster dots. In accordance with one prior art method, the dots may be marked in a dot-on-dot fashion, by marking the substrate with a first and second color separation, with the dots of the second color separation superimposed over the dots of the first color separation for achieving the desired color. In accordance with a second prior art method, the dots are applied in a dot-off-dot fashion, with the dots of the second color separation placed in the voids of the dots the first color separation for achieving the desired color. Multi-color printing systems are susceptible to misregistration between color separations due to a variety of mechanical related issues. For both dot-on-dot and dot-off-dot rendering, color separation misregistration may cause a significant color shift in the actual printed color that is noticeable to the human eye.

Another marking method of rotated cluster dot sets is widely used since anomalies (e.g., color shifts) due to color separation misregistrations are subtle and less detectable by the human eye. However, even in these cases, color misregistrations may be objectionable, particularly at edges of objects that contain more than one separation. Therefore, it is important to characterize color separation misregistration in order to perform corrective action in the print engine.

Many prior art methods for characterizing misregistration of color separations include using physical registration marks. The registration marks include two fine straight lines, each line formed using a different color separation. The two lines are aligned and joined to form one straight line. Alignment of the two lines is analyzed, with misalignment indicating misregistration of one of the color separations relative to the other. The analysis may include studying the printed registration marks with a microscope and visually determining if misregistration has occurred. Such analysis is tedious and not conducive to automation. The analysis may include imaging the marker with a high resolution scanning device and analyzing the high resolution scanned image using complex software for determining the positions of the registration marks relative to one another. This type of analysis may require expensive high resolution scanning equipment and may involve a significant amount of computational power. Furthermore, this type of processing is prone to error due to even small defects, such as toner splatter.

In another prior art method used for higher end printer devices outputting high volume and/or high quality images, misregistration of color separations is characterized by measuring the transition time between the edges of two primary separation patches (e.g., cyan and magenta) on a moving photoreceptor belt. The patches have angled edges (e.g., chevrons) that allow the determination of misregistration in both the fast scan direction (transverse to the longitudinal axis of the photoreceptor belt) and slow scan direction (parallel to the longitudinal axis of the photoreceptor belt). Simple photodetectors are used to measure the time between the moving edges of the chevrons, and this may in turn be used to compute the misregistration in both slow and fast scan directions. A drawback to this method is the inability to take misregistration measurements across the page, as the photodetectors are present in only two or three locations across the width of the photoreceptor belt. This method of separation misregistration characterization has been designated for use with high end printer systems due to the cost of the photodetectors and associated analysis software.

Other prior art methods include, as mentioned above, using periodic line patterns for detecting color misregistration. For example, FIG. 1 shows a prior art color registration line pattern used to detect color registration. In the color registration pattern identified by reference numeral 100, black is the reference color. The 7's (element 110) are used to determine lateral misregistration and the dashes (element 120) are used to determine process direction misregistration. Even though not evident from the black and white drawing shown by FIG. 1, the 7's alternate between a colored 7 and a black 7. Each color/black pair of 7's gives one set of lateral measurements. In FIG. 1, there are three lateral measurements per color for a total of 18 marks, and nine process direction measurements per color for a total of 36 marks. The process direction is shown by arrow 130.

FIG. 2 illustrates an enlarged view of FIG. 1. The pattern is identified by reference numeral 200. All dimensions in FIG. 2, for illustrative purposes, are in 1200 dpi. FIG. 2 also shows the position of a mark-on-belt (MOB) sensor 250 and the MOB sensor's line of sight 260. The pattern includes a segment or mark 16 for each color (i.e., cyan 210, magenta 220, yellow 230, and black 240). The line pattern is repeated nine times for each color for a total printout of 36 line segments or marks. Only the number of line segments or marks is counted by the misregistration system. Thus, if there is an error, the color associated with the error is not known.

As each segment passes under the view of the MOB sensor 250, a square wave 300 is generated for each segment as shown by FIG. 3. All the rectangles in the square wave 300 have the same width, since all segments as shown by FIG. 2 have the same width. Reference numerals 310 and 320 respectively identify the time at which the leading edge of the cyan segment is detected by the MOB sensor 250 and the time at which the trailing edge of the black segment is detected by the MOB sensor 250. The center of each segment is shown by reference numeral 330.

In order to detect color-to-color misregistration using the pattern 200 shown by FIG. 2, a time stamp is issued by a processor or controller for the leading edge and trailing edge of each segment. These two time stamps are averaged by the processor to calculate a time stamp for the center of each segment or mark. The time between the center of each color segment (CMY) and the center of the reference segment (K), along with knowledge of the process speed, permits the processor to calculate the position of each color segment relative to the reference segment and the position of the reference segment relative to the MOB sensors. These values are compared by the processor with the nominal positions of each segment to generate a positional error (in the process direction) for each CMYK pattern.

The MOB sensors have no concept of which color segments or marks they are actually determining because they see all the colors almost equally. In order to determine which colors are being read, the number of colors detected has to be exactly equal to the number of colors expected. Since the order in which the color segments or marks are laid down is known ahead of time, if the correct number of segments is seen by the MOB sensors, it is assumed that the order of the colors determined corresponds directly to what is expected.

However, if there are too many or too few segments, the color registration controller has no means to determine which colors are missing or which ones are being erroneously detected. Without that information, the processor discards all of the data and does not issue a correction command to the color registration actuators. The result is either a productivity loss (if an additional color registration iteration needs to be performed), or a performance issue (if the controller chooses not to make another attempt and the current levels of misregistration remain unchanged).

SUMMARY

It is an aspect of the present disclosure to provide a system and method for detecting color-to-color process direction misregistration using a color registration pattern that overcomes the drawback of prior art line patterns.

It is another aspect of the present disclosure to provide a system and method for detecting color-to-color process direction misregistration by analyzing a color registration pattern using a simple processing algorithm for minimizing the system processing load.

It is another aspect of the present disclosure to provide a color registration pattern which enables a color-to-color misregistration system to detect process direction misregistration errors and know which color is associated with the misregistration errors.

Accordingly, the present disclosure is directed to a color-to-color misregistration and detection system. The system is also capable of correcting color-to-color process direction misregistration errors. The system includes a printer capable of printing in a plurality of colors. The printer has a sensor, such an MOB sensor, for generating a signal having information corresponding to a color registration pattern printed on a substrate by the printer. The system further includes a processor for receiving the signal from the sensor and analyzing the signal for detecting color-to-color process direction misregistration. The color registration pattern includes a plurality of segments each associated with a different color of the plurality of colors. Each segment of the plurality of segments includes at least one different dimension from at least one other segment of the plurality of segments. In particular, in one embodiment, each segment is rectangular-shaped and has a width having a different measurement than the width of at least one other segment. It is also envisioned that each segment may be circular-shaped, oblong-shaped, triangular-shaped, etc., and have at least one different dimension from at least one other segment of the plurality of segments.

The processor includes a color-to-color misregistration analysis module which is executable on the processor for detecting color-to-color process direction misregistration of a first color of the plurality of colors relative to a second color of the plurality of colors. In one embodiment in accordance with the present disclosure, the color space is CMYK. However, the present disclosure may be implemented for other color spaces, such as CIE L*a*b*, XYZ, and RGB.

In order to detect misregistration, the color-to-color misregistration analysis module generates a square wave using the signal from the sensor. The square wave is analyzed using an algorithm in accordance with the present disclosure to determine whether there is any color-to-color process direction misregistration. The processor performs color-to-color misregistration correction on whichever color(s) it has data for, if it determines there exists at least one color-to-color misregistration.

The present disclosure is also directed to a method for detecting color-to-color misregistration in a printing system having a printer capable of printing in a plurality of colors. The method includes generating a signal having information corresponding to a color registration pattern printed on a substrate by the printer, and analyzing the signal for detecting color-to-color process direction misregistration. The color registration pattern, as described above, includes a plurality of segments each associated with a different color of the plurality of colors. Each segment of the plurality of segments includes at least one different dimension from at least one other segment of the plurality of segments. In particular, in one embodiment, each segment is rectangular-shaped and has a width having a different measurement than the width of at least one other segment. It is also envisioned that each segment may be circular-shaped, oblong-shaped, triangular-shaped, etc., and have at least one different dimension from at least one other segment of the plurality of segments.

In order to detect color-to-color process direction misregistration, during the analyzing step, a square wave is generated using the signal from the sensor. The square wave is analyzed using an algorithm in accordance with the present disclosure to determine whether there is any color-to-color process direction misregistration. The method further includes correcting the color-to-color misregistration if it is determined there exists at least one color-to-color misregistration.

The present disclosure is further directed to a color registration pattern. The color registration pattern includes a plurality of segments each associated with a different color of a plurality of colors. Each segment of the plurality of segments includes at least one different dimension from at least one other segment of the plurality of segments. In particular, in one embodiment, each segment is rectangular-shaped and has a width having a different measurement than the width of at least one other segment. It is also envisioned that each segment may be circular-shaped, oblong-shaped, triangular-shaped, etc., and have at least one different dimension from at least one other segment of the plurality of segments. The color registration pattern is configured for being printed by a printer on a substrate and sensed by a sensor in order to determine color-to-color process direction misregistration.

Other features of the presently disclosed system and method for detecting color-to-color process direction misregistration will become apparent from the following detailed description, taken in conjunction with the accompanying drawings, which illustrate, by way of example, the presently disclosed system and method.

BRIEF DESCRIPTION OF THE DRAWINGS

Various embodiments of the present disclosure will be described below with reference to the figures, wherein.

DETAILED DESCRIPTION

Figure 1:
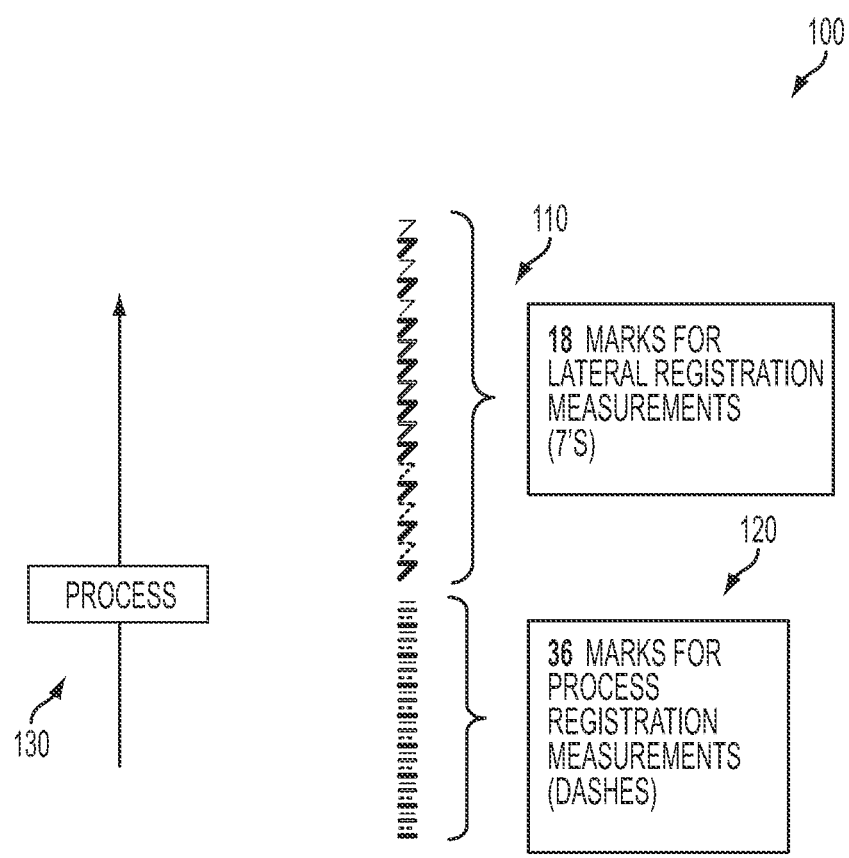
FIG. 1 illustrates a prior art color registration pattern for measuring lateral and process direction misregistration.

Referring now to the drawing figures, in which like references numerals identify identical or corresponding elements, the color separation misregistration characterization (CSMC) system and method in accordance with the present disclosure will now be described in detail.

In the following detailed description, reference is made to the accompanying drawings, which form a part hereof, and in which is shown by way of illustration specific illustrative embodiments in which the present disclosure may be practiced. These embodiments are described in sufficient detail to enable those skilled in the art to practice the present disclosure, and it is to be understood that other embodiments may be utilized and that logical, mechanical and electrical changes may be made without departing from the scope of the disclosure. The following detailed description is, therefore, not to be taken in a limiting sense.

Prior to describing the present disclosure in further detail, it will first be helpful to define various terms that will be used throughout the following discussion. For example:

The term "printer device" as used herein encompasses any apparatus or system, such as a digital copier, xerographic printing system, ink jet printing system, reprographic printing system, bookmaking machine, facsimile machine, multifunction machine, textile marking machine, etc., which performs a marking output function for any purpose. The modality for marking may include, for example, applying toner, ink, dye, etc., to the substrate or embossing, peening, etching, etc. the substrate. The substrate may be a material such as paper, cardboard, a transparency, a paper derivative, metal, plastic, glass, wood, cloth, etc.

The term "image," as used in this disclosure refers to a graphic or plurality of graphics, compilation of text, a contone or halftone pictorial image, or any combination or sub-combination thereof, that is capable of being output on a display device, a marker and the like, including a digital representation of such image. For example, an image may be a combination of graphics, text and pictures that is represented by a series of pixel values denoting the color, intensity, etc., of the particular pixels that make up the image. A special subclass of images is images associated with complete documents, which are hereinafter referred to as "document images."

The term "analyze" may refer to determining the elements or essential features or functions or processes of the printers for computational processing and/or power processing. The term "analyze" may further refer to tracking data and/or collecting data and/or manipulating data and/or examining data and/or updating data on a real-time basis in an automatic manner and/or a selective manner and/or manual manner.

Additionally, the color measurement may include measurements of human-visual color values such as CIE L*a*b*, XYZ, or non-human-visual color values such as RGB and CMYK, or a combination thereof. For example, the colorimetric values may include an average color value for each patch, a color value for one or more samples (e.g., dots, portions or small areas, etc.) of each respective patch, or a function of multiple samples for each respective patch.

The colorimetric value may be expressed using a model, such as the Lab Color Model (lightness (luminance), a* and b*), as is known in the art for describing color in three dimensions, on x, y and z axes. The z (vertical) axis corresponding to lightness (luminance), and the x and y axes corresponding to the a* and b* channel, with the a* channel representing color transitions between red and green, and the b* channel representing color transitions between blue and yellow. The color value may be expressed in terms of luminance only, in terms of chroma only or a combination thereof. In accordance with the CIE L*a*b* model, the chroma corresponds to the a* and b* channels only, where the chroma magnitude corresponds to the radius of a vector in the a*b* plane. Other models or methods may be used for describing color characteristics, such as in terms of RGB (red-green-blue) or CMYK (cyan-magenta-yellow-black) color spaces.

Embodiments will be described below while referencing the accompanying figures. The accompanying figures are merely examples and are not intended to limit the scope of the present disclosure.

Figure 4:
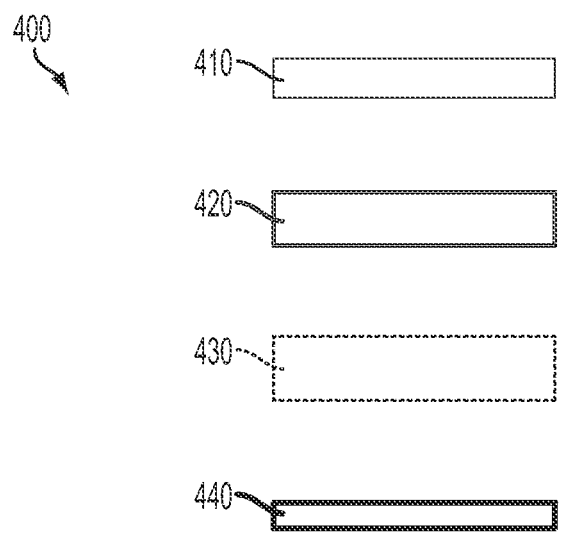
FIG. 4 illustrates a color registration pattern for measuring process direction color-to-color misregistration, in accordance with the present disclosure.

Referring to FIG. 4, a color registration pattern for measuring process direction color-to-color misregistration, in accordance with the present disclosure is presented.

Figure 2:
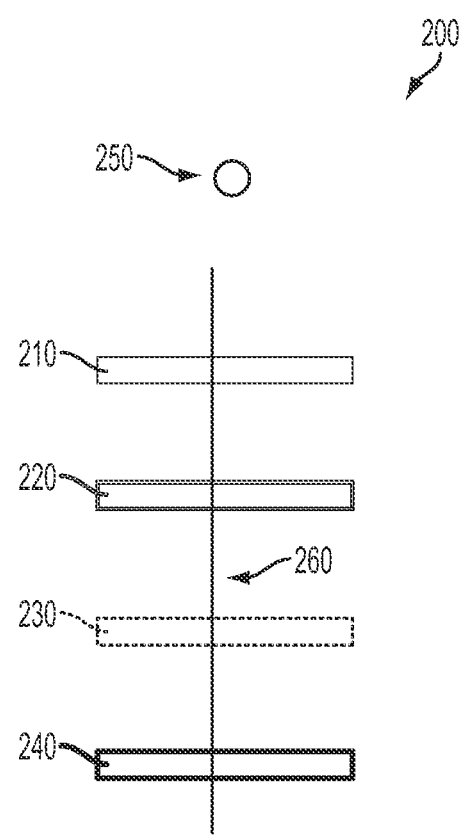
FIG. 2 illustrates an enlarged view of FIG. 1 showing a prior art color registration pattern for measuring process direction color misregistration.
Figure 3:
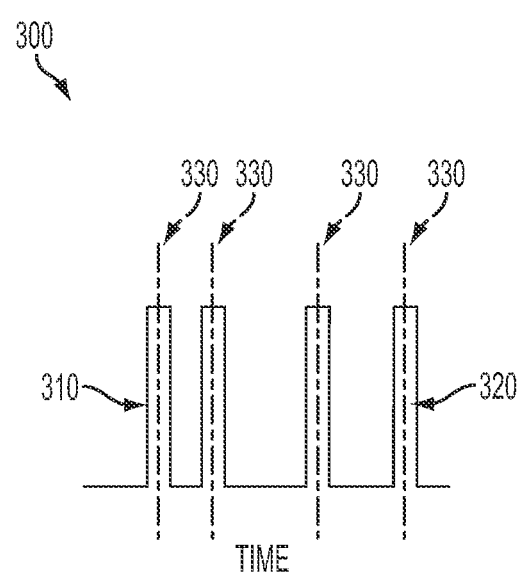
FIG. 3 illustrates a square wave corresponding to the prior art color registration pattern shown by FIG. 2.

The pattern is identified by reference numeral 400. The pattern may be an image. All dimensions in FIG. 2, for illustrative purposes, are in 1200 dpi. The pattern includes a different dimension or size for each color (i.e., cyan 410, magenta 420, yellow 430, and black 440). As seen, the black dimension 440 has a thickness of 48 dpi, the yellow dimension 430 has a thickness of 120 dpi, the magenta dimension 420 has a thickness of 96 dpi, and the cyan dimension 410 has a thickness of 72 dpi. Therefore, the color registration pattern 400 includes a plurality of segments (410, 420, 430, 440), each segment associated with a different color of the plurality of colors and each segment including at least one different dimension (e.g., thickness) from at least one other segment of the plurality of segments. One skilled in the art may contemplate a plurality of different dimensions for each of the plurality of segments.

Each segment of the plurality of segments (410, 420, 430, 440) may include at least one different dimension from at least one other segment of the plurality of segments. In particular, in one embodiment, each segment is rectangular-shaped and has a width having a different measurement than the width of at least one other segment. It is also envisioned that each segment may be circular-shaped, oblong-shaped, triangular-shaped, etc., and have at least one different dimension from at least one other segment of the plurality of segments.

For example, as shown in FIG. 4, the thicknesses of the C,M,Y lines may be 1.5×, 2× and 2.5× thickness of Black, respectively. However, there are numerous values that may be used that would be robust to the variations in the xerographic process. This pattern would yield the square wave pattern shown in FIG. 5 described below.

Additionally, a printer 700 and a processor 710 may be provided. The printer may be capable of printing in a plurality of colors, the printer having a sensor 720 for generating a signal including information corresponding to the color registration pattern 400 printed on a substrate by the printer. The processor may be enabled for receiving the signal from the sensor and analyzing the signal for detecting color-to-color process direction misregistration via an algorithm. The algorithm will be described below with reference to FIG. 6.

The processor may include a color-to-color misregistration analysis module which is executable on the processor for detecting color-to-color process direction misregistration of a first color of the plurality of colors relative to a second color of the plurality of colors. In one embodiment in accordance with the present disclosure, the color space is CMYK. However, the present disclosure may be implemented for other color spaces, such as CIE L*a*b*, XYZ, and RGB. The color-to-color misregistration analysis module may generate a square wave using the signal from the sensor, as described with reference to FIG. 5.

Figure 5:
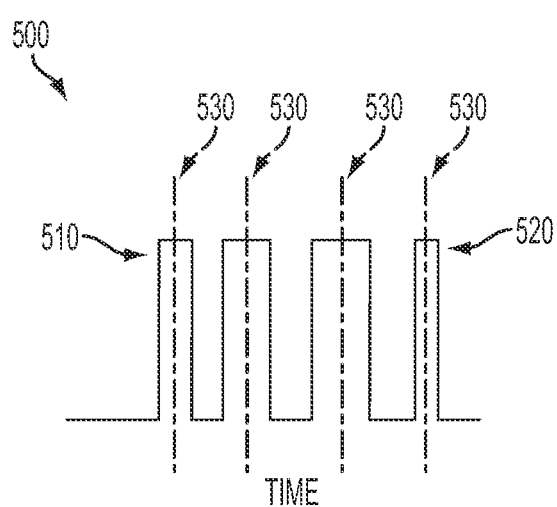
FIG. 5 illustrates a square wave corresponding to the color registration pattern shown by FIG. 4, in accordance with the present disclosure.

Referring to FIG. 5, a square wave corresponding to the color registration pattern shown by FIG. 4, in accordance with the present disclosure is presented.

The square wave 500 is generated for each segment as shown by FIG. 5. All the rectangles in the square wave 500 have different widths, since all segments as shown by FIG. 4 have the different widths. Reference numerals 510 and 520 respectively identify the time at which the leading edge of the cyan segment is detected by the sensor and the time at which the trailing edge of the black segment is detected by the sensor. The center of each segment is shown by reference numeral 530.

The square wave 500 is analyzed using the algorithm (see FIG. 6) to determine whether there is any color-to-color process direction misregistration. Additionally, the processor performs color-to-color misregistration correction on whichever color(s) it has data for, if it determines there exists at least one color-to-color misregistration.

Figure 6:
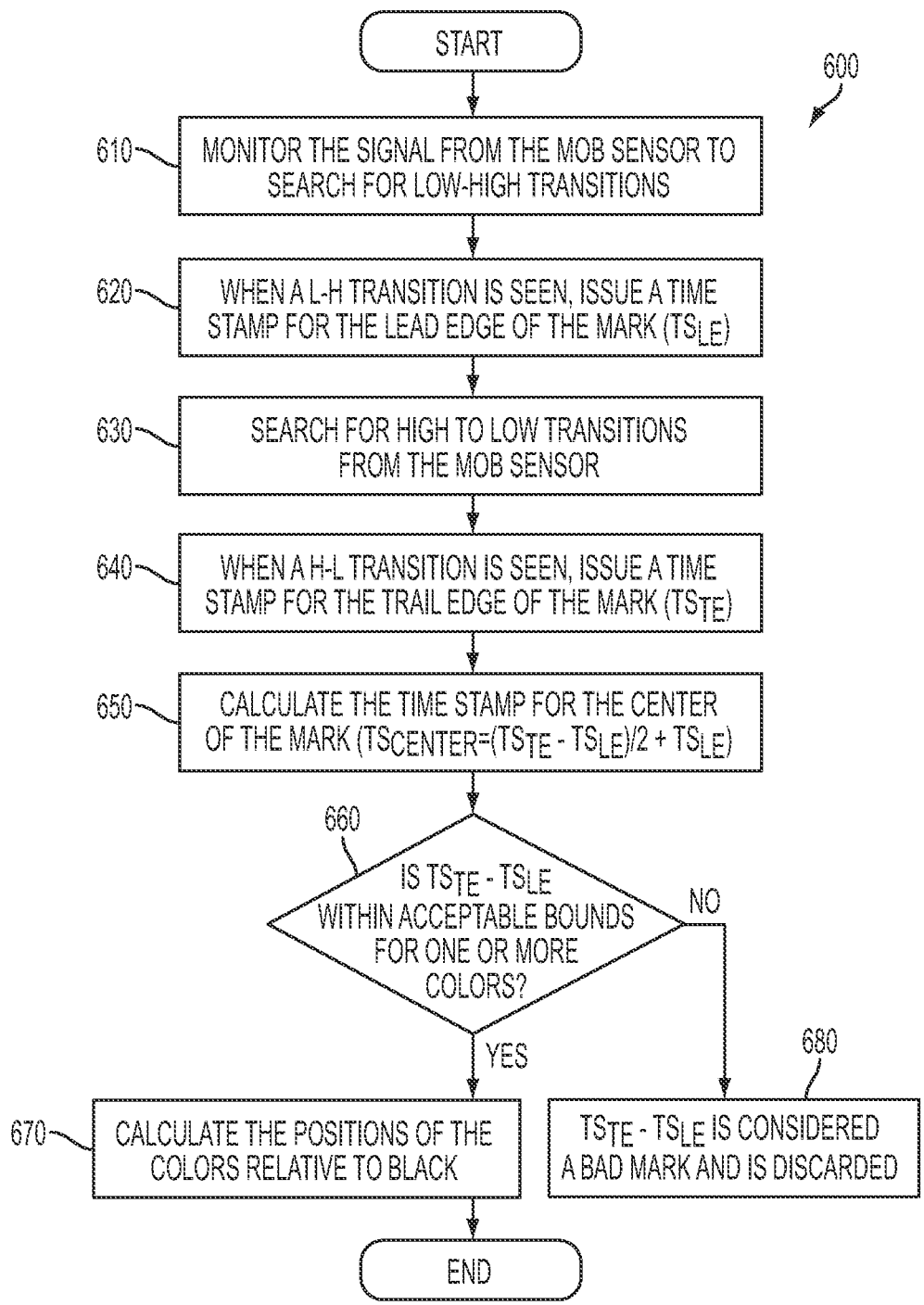
FIG. 6 is a flow chart showing the steps performed by the color-to-color misregistration analysis module for detecting process direction color-to-color misregistration, in accordance with the present disclosure.
Figure 7:
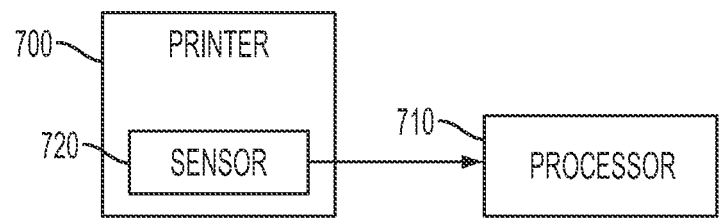
FIG. 7 is a schematic diagram showing a printer capable of printing in a plurality of colors, a sensor and a processor, in accordance with an embodiment of the present disclosure.

Referring to FIG. 6, a flow chart showing the steps performed by the color-to-color misregistration analysis module for detecting process direction color-to-color misregistration, in accordance with the present disclosure is presented.

In general, the algorithm detects a first time stamp of a leading edge of a first color and a second time stamp of a trailing edge of the first color, averages the first time stamp and the second time stamp, calculates the difference between the leading edge and the trailing edge of the first color, determines if the difference is between a predetermined range and repeats the process for each of the plurality of colors of the color registration pattern.

Specifically, with reference to FIG. 6, the algorithm executes the following process 600. In step 610, the signal is monitored via the MOB sensor to search for Low-High transitions. In step 620, when a L-H transition is seen, a time stamp is issued for the lead edge of the mark ($TS_{LE}$). In step 630, a search is conducted for High to Low transitions from the MOB sensor. In step 640, when a H-L transition is seen, a time stamp is issued for the trail edge of the mark ($TS_{TE}$). In step 650, the time stamp for the center of the mark ($TS_{center} = (TS_{TE}-TS_{LE})/2+TS_{LE}$) is calculated. In step 660, a decision is made whether $TS_{TE}-TS_{LE}$ is within acceptable bounds for one or more colors. If the answer is YES, then the process moves to step 670 where the positions of the colors relative to black are calculated. If the answer is NO, then the process moves to step 680 where $TS_{TE}-TS_{LE}$ is considered a bad mark and is discarded. The process then ends for the first cycle or first iteration. However, the process may be a continuous iterative process. In other words, the steps of the process may repeat for a number cycles or iterations, where at least the monitoring, sensing, transitioning, and calculating steps are constantly repeated.

Moreover, with reference to step 660, if $TS_{TE}-TS_{LE}$ is within the acceptable bounds for an expected Cyan mark (say +/−10% of nominal), the algorithm assigns $TS_{center}$ to be the time stamp for Cyan. If $TS_{TE}-TS_{LE}$ is within the acceptable bounds for an expected Magenta mark (say +/−10% of nominal), the algorithm assigns $TS_{center}$ to be the time stamp for Magenta. If $TS_{TE}-IS_{LE}$ is within the acceptable bounds for an expected Yellow mark (say +/−10% of nominal), the algorithm assigns $TS_{center}$ to be the time stamp for Yellow. If $TS_{TE}-IS_{LE}$ is within the acceptable bounds for an expected Black mark (say +/−10% of nominal), the algorithm assigns $TS_{center}$ to be the time stamp for Black. Then, in step 680, if $TS_{TE}-TS_{LE}$ cannot be assigned to any of the colors, then it is considered to be a bad mark and discarded and if a time stamp for the black mark is not detected for this set of 4 registration marks, then the positions of the other colors relative to black cannot be calculated and the time stamps for existing colors are discarded. It is also noted that the algorithm may properly detect colors even if they are out of order, as long as they do not overlap.

Additionally, the exemplary embodiments of the present disclosure may be extrapolated to include lateral misregistration by having the 7s have different thicknesses for each color, which is 48 pixels thick for black; 96 pixels thick for magenta; 72 pixels thick for cyan; and 120 pixels thick for yellow, as illustrated with respect to FIG. 4 for the process misregistration.

In summary, the present disclosure involves making the patterns unique for each color. Since the time between the leading edge and the trailing edge of a mark is being detected, each color may have a mark of a different size, which may be tested for in the controller algorithm. The algorithm may make the color determinations and perform the correction on whichever color is has data for.

Thus, the current method for processing involves issuing a time stamp for the lead edge and trail edge of each mark. These two time stamps are averaged to calculate a time stamp for the center of each mark. The time between the center of each color mark (CMY) and the center of the reference mark, along with knowledge of the process speed permits the calculation of position of each color mark relative to the reference and the position of the reference mark relative to the MOBs. These values are compared with the nominal positions of each mark to generate a positional error (in the process direction) for each CMYK.

Additionally, when the time stamps of the lead and trail edge of each mark are generated, in addition to averaging them to determine the time stamp of the center of the mark, the difference between the lead edge and trail edge may be calculated. If the difference is within the specified range, for a given color, then the center time stamp is assigned to that color. This is illustrated using the algorithm described above with reference to FIG. 6.

The following discussion is intended to provide a brief, general description of suitable computing environments in which the method and system may be implemented. Although not required, the method and system are described in the general context of computer-executable instructions, such as program modules, being executed by a printer or single computer or an MFD (multi-functional device) or a server or a plurality of processors for running the processing algorithm. Generally, program modules include routines, programs, objects, components, data structures, etc., that perform particular tasks or implement particular abstract data types. Moreover, those skilled in the art will appreciate that the method and system may be practiced with other computer system configurations, including hand-held devices, multi-processor systems, microprocessor-based or programmable consumer electronics, networked PCs, minicomputers, mainframe computers, MFDs, and the like. The method and system may also be practiced in distributed computing environments where tasks are performed by remote processing devices that are linked through a communication network. In a distributed computing environment, program modules may be located in both local and remote memory storage devices.

Additionally, "code" as used herein, or "program" as used herein, is any plurality of binary values or any executable, interpreted or compiled code which may be used by a computer or execution device to perform a task. This code or program may be written in any one of several known computer languages. A "computer," as used herein, may mean any device which stores, processes, routes, manipulates, or performs like operation on data. A "computer" may be incorporated within one or more printers or MFDs or servers to operate one or more processors to run the processing algorithm. It is to be understood, therefore, that this disclosure is not limited to the particular forms illustrated and that it is intended in the appended claims to embrace all alternatives, modifications, and variations which do not depart from the spirit and scope of the embodiments described herein.

The present disclosure also includes as an additional embodiment a computer-readable medium which stores programmable instructions configured for being executed by at least one processor for performing the methods described herein according to the present disclosure. The computer-readable medium may include flash memory, CD-ROM, a hard drive, etc.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system for correcting color-to-color process direction misregistration errors, the system comprising:
    a printer capable of printing in a plurality of colors, the printer having a sensor for generating a signal including information corresponding to a color registration pattern printed on a substrate by the printer; and
    a processor for receiving the signal from the sensor and analyzing the signal for detecting color-to-color process direction misregistration via an algorithm;
    wherein the color registration pattern includes a plurality of segments, each segment associated with a different color of the plurality of colors, each segment including at least one different dimension from at least one other segment of the plurality of segments and the processor determines the different color of the plurality of colors corresponding to each segment based on the at least one different dimension and assigns a color of the plurality of colors to each segment.

2. The system according to claim 1, wherein each segment of the plurality of segments is rectangular-shaped and has a width having a different measurement than a width of at least one other segment.

3. The system according to claim 1, wherein each segment of the plurality of segments has one of the following shapes: circular-shaped, oblong-shaped, and triangular-shaped.

4. The system according to claim 1, wherein the processor includes a color-to-color misregistration analysis module which is executable on the processor for detecting color-to-color process direction misregistration of a first color of the plurality of colors relative to a second color of the plurality of colors.

5. The system according to claim 4, wherein the color-to-color misregistration analysis module generates a square wave using the signal from the sensor.

6. The system according to claim 5, wherein the square wave is analyzed using the algorithm to determine whether there is any color-to-color process direction misregistration.

7. The system according to claim 1, wherein the processor performs color-to-color misregistration correction on whichever color(s) it has data for, if it determines there exists at least one color-to-color misregistration.

8. The system according to claim 1, wherein the algorithm:
    detects a first time stamp of a leading edge of a first color and a second time stamp of a trailing edge of the first color;
    averages the first time stamp and the second time stamp;
    calculates a difference between the leading edge and the trailing edge of the first color;
    determines if the difference is between a predetermined range; and
    repeats detecting, averaging, calculating and determining for each of the plurality of colors of the color registration pattern.

9. The system according to claim 1, wherein a color space of the plurality of colors is a CMYK color space.

10. The system according to claim 1, wherein the misregistration is lateral misregistration.

11. A method for detecting color-to-color process direction misregistration in a printing system, the method comprising:
    sending a color registration pattern to a printer capable of printing a plurality of colors;
    generating a signal via a sensor, the signal having information corresponding to the color registration pattern printed on a substrate by the printer;
    receiving the signal from the sensor via a processor; and
    analyzing the signal for detecting color-to-color process direction misregistration via an algorithm;
    wherein the color registration pattern includes a plurality of segments, each segment associated with a different color of the plurality of colors, each segment including at least one different dimension from at least one other segment of the plurality of segments and the processor determines the different color of the plurality of colors corresponding to each segment based on the at least one different dimension and assigns a color of the plurality of colors to each segment.

12. The method according to claim 11, wherein each segment of the plurality of segments is rectangular-shaped and has a width having a different measurement than a width of at least one other segment.

13. The method according to claim 11, wherein each segment of the plurality of segments has one of the following shapes: circular-shaped, oblong-shaped, and triangular-shaped.

14. The method according to claim 11, further comprising including a color-to-color misregistration analysis module which is executable on the processor for detecting color-to-color process direction misregistration of a first color of the plurality of colors relative to a second color of the plurality of colors.

15. The method according to claim 14, further comprising generating a square wave using the signal from the sensor via the color-to-color misregistration analysis module.

16. The method according to claim 15, further comprising analyzing the square wave using the algorithm to determine whether there is any color-to-color process direction misregistration.

17. The method according to claim 11, further comprising performing color-to-color misregistration correction on whichever color(s) it has data for, if it determines there exists at least one color-to-color misregistration.

18. The method according to claim 11, further comprising executing the following steps via the algorithm:
- detecting a first time stamp of a leading edge of a first color and a second time stamp of a trailing edge of the first color;
- averaging the first time stamp and the second time stamp;
- calculating a difference between the leading edge and the trailing edge of the first color;
- determining if the difference is between a predetermined range; and
- repeating the steps of detecting, averaging, calculating and determining for each of the plurality of colors of the color registration pattern.

19. The method according to claim 11, wherein a color space of the plurality of colors is a CMYK color space.

20. The method according to claim 11, wherein the misregistration is lateral misregistration.

* * * * *